(12) United States Patent  
Kistler et al.

(10) Patent No.: US 7,156,348 B1  
(45) Date of Patent: Jan. 2, 2007

(54) PLATFORM AND SYSTEM FOR PROPELLANT TANK STORAGE AND TRANSFER IN SPACE

(76) Inventors: Walter P. Kistler, 11423 Red Wood Rd., NE., Redmond, WA (US) 98052; Robert A. Citron, 14907 19th Ave. SE., Mill Creek, WA (US) 98012; Thomas C. Taylor, 3705 Canyon Ridge Arc, Las Cruces, NM (US) 88011

( * ) Notice: Subject to any disclaimer, the term of this patent is extended or adjusted under 35 U.S.C. 154(b) by 0 days.

(21) Appl. No.: 11/076,926

(22) Filed: Mar. 11, 2005

(51) Int. Cl.  
*B64G 1/64* (2006.01)

(52) U.S. Cl. .................................................. 244/172.4

(58) Field of Classification Search ............ 244/172.2, 244/172.3, 172.4, 172.5, 137.4; 414/17  
See application file for complete search history.

(56) References Cited

U.S. PATENT DOCUMENTS

| | | | |
|---|---|---|---|
| 2,404,195 A | 7/1946 | Schlieben | |
| 4,044,974 A | 8/1977 | Lingley et al. | |
| 4,300,737 A | 11/1981 | Byrne et al. | |
| 4,324,374 A | 4/1982 | Wittmann et al. | |
| 4,471,926 A * | 9/1984 | Steel, III | 244/171.1 |
| 4,579,302 A * | 4/1986 | Schneider et al. | 244/159.4 |
| 4,609,169 A * | 9/1986 | Schweickert et al. | 244/169 |
| 4,637,447 A | 1/1987 | Frank et al. | |
| 4,664,343 A | 5/1987 | Lofts et al. | |
| 4,679,752 A | 7/1987 | Wittmann et al. | |
| 4,699,339 A | 10/1987 | Rosen et al. | |
| 4,771,971 A | 9/1988 | Ludwig et al. | |
| 4,775,120 A | 10/1988 | Marwick | |
| 4,880,187 A * | 11/1989 | Rourke et al. | 244/159.4 |
| 4,896,848 A | 1/1990 | Ballard et al. | |
| 4,964,596 A * | 10/1990 | Ganssle et al. | 244/172.5 |
| 5,083,726 A | 1/1992 | Schurr | |
| 5,092,545 A * | 3/1992 | Butterfield et al. | 244/158.1 |
| 5,141,181 A | 8/1992 | Leonard | |
| 5,158,249 A | 10/1992 | Uphoff | |
| 5,236,153 A | 8/1993 | LaConte | |
| 5,305,970 A | 4/1994 | Porter et al. | |
| 5,429,328 A | 7/1995 | Dobbs et al. | |
| 5,595,123 A | 1/1997 | Tao et al. | |
| 5,816,539 A | 10/1998 | Chan et al. | |
| 5,826,825 A | 10/1998 | Gabriel | |
| 6,059,233 A | 5/2000 | Koppel et al. | |
| 6,149,104 A * | 11/2000 | Soranno | 244/159.4 |
| 6,299,107 B1 * | 10/2001 | Kong et al. | 244/172.4 |
| 6,360,994 B1 | 3/2002 | Hart et al. | |
| 6,385,512 B1 | 5/2002 | Belbruno | |
| 6,481,670 B1 | 11/2002 | Bigelow et al. | |
| 6,557,803 B1 | 5/2003 | Carpenter et al. | |

(Continued)

OTHER PUBLICATIONS

U.S. Appl. No. 10/862,604 to Kistler et al., filed Jun. 7, 2004.

(Continued)

*Primary Examiner*—Tien Dinh  
(74) *Attorney, Agent, or Firm*—Greenblum & Bernstein, P.L.C.

(57) ABSTRACT

A platform for storage and transfer of propellant tanks in space includes frames configured to releasably support plural propellant tanks in storage positions, and transfer mechanisms configured to transfer propellant tanks to and from the storage positions. The platform includes a central structure to which the plural frames are connected at predetermined spaced intervals. The transfer mechanisms include extendable telescoping arms mounted to the central structure. The arms have end effectors configured to grip bands on propellant tanks. Two platforms may be positioned adjacent each other for the transfer of propellant tanks therebetween.

31 Claims, 6 Drawing Sheets

U.S. PATENT DOCUMENTS

| | | |
|---|---|---|
| 6,568,639 B1 | 5/2003 | Carpenter et al. |
| 6,612,522 B1 | 9/2003 | Aldrin et al. |
| 6,666,409 B1 | 12/2003 | Carpenter et al. |
| 6,669,148 B1 | 12/2003 | Anderman et al. |
| 6,739,555 B1 | 5/2004 | Mazanek et al. |
| 2002/0079407 A1 | 6/2002 | Lounge et al. |

OTHER PUBLICATIONS

U.S. Appl. No. 11/076,950 to Kistler et al., filed Mar. 11, 2005.

Cady et al., "Cryogenic Propellant Management Architectures To Support The Space Exploration Initiative", AIAA-90-3713, Sep. 1990, 11 pages.

Hodge, "Space Transfer Vehicles For The Space Exploration Initiative", AIAA-92-1418, Mar. 1992, 9 pages.

NASA Brochure "The Vision For Space Exploration", dated Feb. 2004, 32 pages.

NASA Synopsis "Exploration Systems Enterprise Request For Information", dated Apr. 21, 2004, 10 pages.

* cited by examiner

PLATFORM AND SYSTEM FOR PROPELLANT TANK STORAGE AND TRANSFER IN SPACE

No government funding, no government support or government contract or clause is related to this invention.

BACKGROUND OF THE INVENTION

1. Field of the Invention

The present invention relates to apparatus and method for storing and transferring propellant tanks in space.

2. Description of the Related Art

The transportation of cargo between locations in space and maintaining a support platform in orbit is expensive. Part of that cost is propellant, and human development beyond earth orbit currently depends on chemical propellant for transportation to the moon, mars and beyond. High costs create a barrier to the commercial transportation hardware development of space and the investment of private capital in technically viable space transportation ventures. Part of this cost is the expense caused by transferring propellant between vehicles.

Rocket propelled space vehicles travel outside the proximity of the Earth in airless space. Such vehicles may, for example, start a trip from Earth orbit and travel to the surface of the Moon. Such trips use large amounts of propellants, requiring the use of enormous multi-stage rockets to transport the propellant required for the round trip. Such rockets may be similar to the Saturn first stage of the Apollo project, which landed the first man on the Moon more than 30 years ago.

The transfer of cryogenic propellant in the vacuum of space is complicated, difficult to automate, requires precooling, other care and may result in the loss of propellant. Propellant transfer in space is conventionally performed by coupling a single large propellant supply tank with a receiving tank of a vehicle, precooling the receiving tank, transferring the propellant to the receiving tank, and decoupling the tanks. Such systems require precision coupling, propellant settling, precooling, boil-off and leak prevention, sensing of quantities and flow rates, and sophisticated designs for tanks and sensors, which result in very complex transfer processes on earth in one gravity. The lack of gravity adds another level of complexity and is difficult to fully automate.

SUMMARY OF THE INVENTION

The present invention has been made in view of the above-described problems. Accordingly, it is an object of the present invention to provide a method and an apparatus for more efficient and less complex storing and transferring of propellant in space.

In order to accomplish the transfer of cryogenic propellant in an automatic manner according to the present invention, an entire cryogenic tank is transferred. Accordingly, the tank may be tapped at a later time to obtain the propellant as it is required. Full tanks may be stored in propellant racks or on platforms which are located in orbit around a planet or moon. The tank can be reusable or disposable, which benefits from a less complex design. The present invention can extend the range of vehicles, and may be robotic in nature. In this manner, some propellant transfer issues are effectively transferred to different times and locations.

The present invention further provides payload transfer hardware for manned or unmanned orbital transportation vehicles, which can move payloads from one transportation device to another. Such hardware permits delivery of payloads using transportation hardware in earth orbit to locations beyond earth orbit. The present invention provides affordable commercial payload transportation services to and from space vehicles, orbital transportation support nodes and celestial bodies at either end of various transportation cycles within space transportation in general.

According to one aspect of the invention, a platform for storage and transfer of propellant tanks in space includes at least one frame configured to releasably support plural propellant tanks in predetermined storage positions, and at least one transfer mechanism configured to transfer a propellant tank to and from at least one of the predetermined storage positions. The plural propellant tanks can include fuel tanks and oxidizer tanks.

According to a further aspect of the invention, the platform includes a plurality of frames. The predetermined storage positions are located between respective ones of the frames. Further, the predetermined storage positions are defined by spacer elements on the frames, which spacer elements are located between propellant tanks. Each of the frames can be a substantially circular disk. Alternatively, each of the frames can be a substantially hexagonal disk. The platform further includes a central structure, with the frames being connected to the central structure at predetermined spaced intervals.

According to a further aspect of the invention, the transfer mechanism includes an extendable arm. The extendable arm is an axially extendable telescoping arm, and includes an end effector configured to grip a band on a propellant tank during transfer to and from the at least one predetermined storage position.

According to a further aspect of the invention, the transfer mechanism includes an extendable arm. The extendable arm is an axially extendable telescoping arm, and includes an insertion pin having a tip portion configured to be received in a hole in a propellant tank. The tip portion of the insertion pin is configured to expand within the hole in order to grip a propellant tank during transfer to and from the at least one predetermined storage position.

According to a further aspect of the invention, the platform includes a plurality of transfer mechanisms. The platform further includes a central structure, with the transfer mechanisms being mounted to the central structure. The transfer mechanisms can correspond to the predetermined storage positions, such that each of the transfer mechanisms is configured to transfer a propellant tank to and from a corresponding one of the predetermined storage positions. The transfer mechanisms include extendable arms. The extendable arms are axially extendable telescoping arms. The extendable arms can include end effectors configured to grip a band on a propellant tank during transfer to and from the predetermined storage positions. The extendable arms can include insertion pins having tip portions configured to be received in a hole in a propellant tank, and configured to expand within the hole in order to grip a propellant tank during transfer to and from the predetermined storage positions.

According to a further aspect of the invention, the platform includes an attitude control system having thrusters for positioning the platform. The platform can be configured to be positioned in orbit around a celestial body. The platform can be a transportation platform for transportation and storage of cargo in space, and include a motor for moving the platform through space. The platform can further include a transfer interface through which propellant contained in a propellant tank releasably supported in one of the predetermined storage positions is transferred from the propellant tank for use in operating the motor. The platform can be configured to transport cargo from an Earth orbit to lunar orbit.

According to another aspect of the invention, a system for storage and transfer of propellant tanks in space includes a plurality of the platforms. A first of the platforms and a second of the platforms are configured to be positioned adjacent to each other in such a manner that one of the predetermined storage positions of the first platform is aligned with one of the predetermined storage positions of the second platform.

According to a further aspect of the invention, the transfer mechanism of the first platform transfers a propellant tank from the one predetermined storage position of the first platform toward the second platform, and the transfer mechanism of the second platform transfers the propellant tank received from the first platform to the one predetermined storage position of the second platform. The first and second platforms are further configured to be repositioned in such a manner that another of the predetermined storage positions of the first platform is aligned with another of the predetermined storage positions of the second platform.

According to a further aspect of the invention, the transfer mechanisms include extendable arms. The extendable arms are axially extendable telescoping arms. The extendable arms can include end effectors configured to grip a band on a propellant tank during transfer to and from the predetermined storage positions. The extendable arms can include insertion pins having tip portions configured to be received in a hole in a propellant tank, and configured to expand within the hole in order to grip a propellant tank during transfer to and from the predetermined storage positions.

According to a further aspect of the invention, each of the platforms further includes an attitude control system having thrusters for positioning the platform. At least one of the platforms includes a motor for moving the platform through space.

According to another aspect of the invention, a method for storage and transfer of propellant tanks in space includes supporting a propellant tank in a storage position on a first platform, positioning the first platform adjacent to a second platform in space, transferring the propellant tank from the first platform to the second platform, and supporting the propellant tank in a storage position on the second platform.

According to a further aspect of the invention, the method further includes positioning the first platform or the second platform in orbit around a celestial body. The method further includes transporting the first platform or the second platform from an Earth orbit to a lunar orbit. The method further includes propelling the first platform or the second platform through space using a motor. The first platform and the second platform can be positioned adjacent to each other using thrusters.

According to a further aspect of the invention, the propellant tank is transferred from the first platform to the second platform by transfer mechanisms provided on the first platform and the second platform. The transfer mechanisms include extendable arms. The extendable arms are axially extendable telescoping arms. The extendable arms can include end effectors which grip a band on a propellant tank during transfer to and from the storage positions. The extendable arms can include insertion pins having tip portions received in a hole in a propellant tank, the tip portions of the insertion pins expanding within the hole to grip a propellant tank during transfer to and from the storage positions.

The transfer mechanism on the first platform transfers a propellant tank from the storage position on the first platform toward the second platform, and the transfer mechanism on the second platform transfers the propellant tank received from the first platform to the storage position on the second platform. Further, the first platform and the second platform are positioned adjacent to each other in such a manner that the storage position on the first platform is aligned with the storage position on the second platform.

According to a further aspect of the invention, the method further includes repositioning the first platform and the second platform adjacent to each other in such a manner that another storage position on the first platform is aligned with another storage position on the second platform, and transferring another propellant tank from the first platform to the second platform.

BRIEF DESCRIPTION OF THE DRAWINGS

The above and other objects, features and advantages of the present invention will be made apparent from the following description of the preferred embodiments, given as non-limiting examples, with reference to the accompanying drawings in which.

DETAILED DESCRIPTION OF THE PREFERRED EMBODIMENTS

A preferred embodiment of the present invention will be described below with reference to the drawings.

U.S. patent application Ser. No. 10/862,604, which was filed by the current inventors on Jun. 7, 2004, is incorporated by reference herein in its entirety. Such application discloses a space transportation system which may include small, unmanned vehicles, which transfer fuel tanks and payloads in earth orbit, to allow for further transport to a lunar orbit or to the surface of the Moon. Such application describes method for greatly increasing the range of relatively small unmanned space vehicles by providing mobile refueling platforms in space. These mobile platforms, also known as propellant transporters, can rendezvous and dock with space vehicles traveling to the Moon, for example, and replenish their depleted propellant reserves. This is conceptually similar to a car traveling over a long distance, which is able to refuel at gas stations along the way, instead of having to drag along a gasoline tanker. The present disclosure includes equipment to transfer propellants between two space platforms or vehicles, and describes a simple and reliable procedure to effect such transfers.

Figure 1:
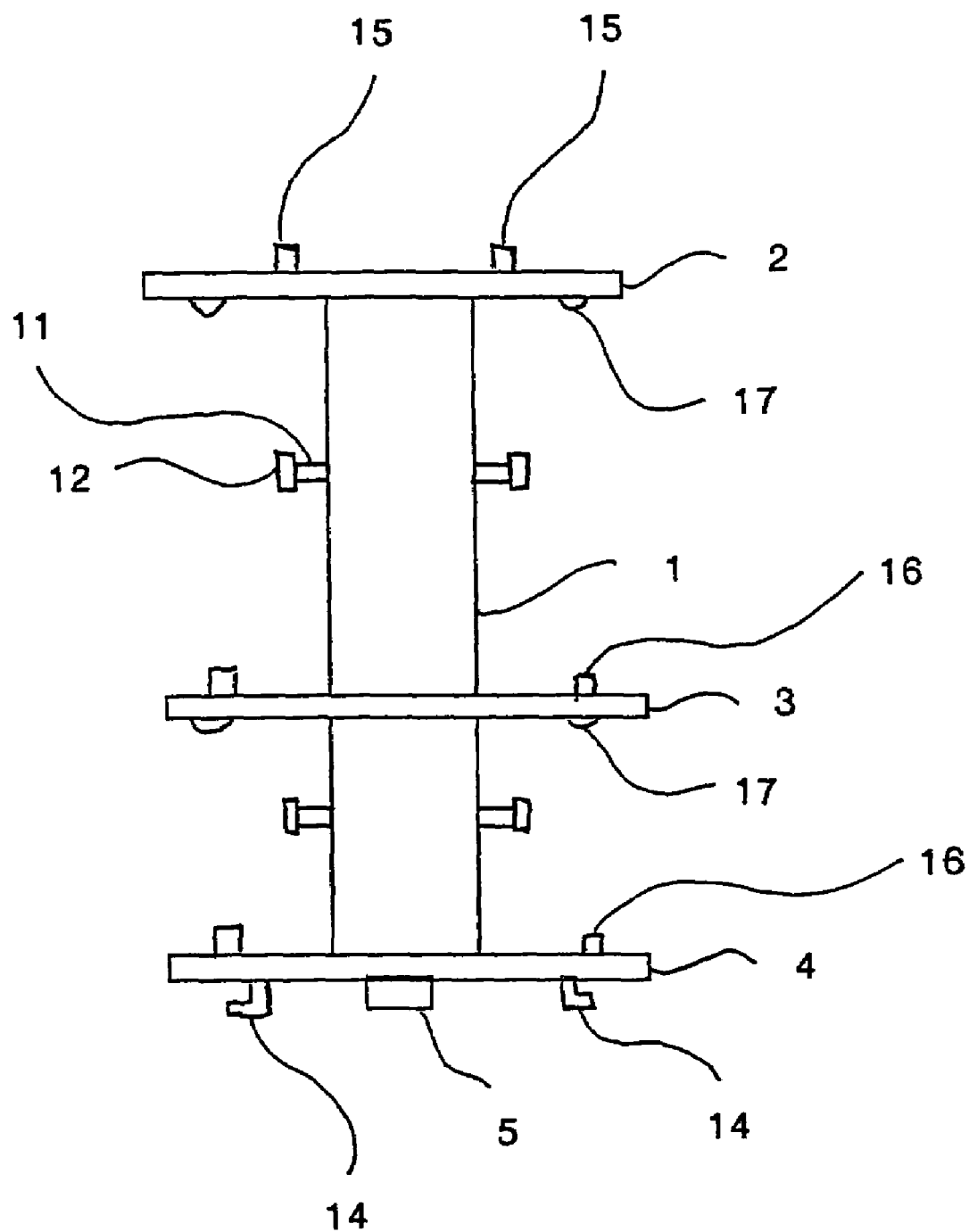
FIG. 1 is a side view of an embodiment of a platform according to the present invention.
Figure 5:
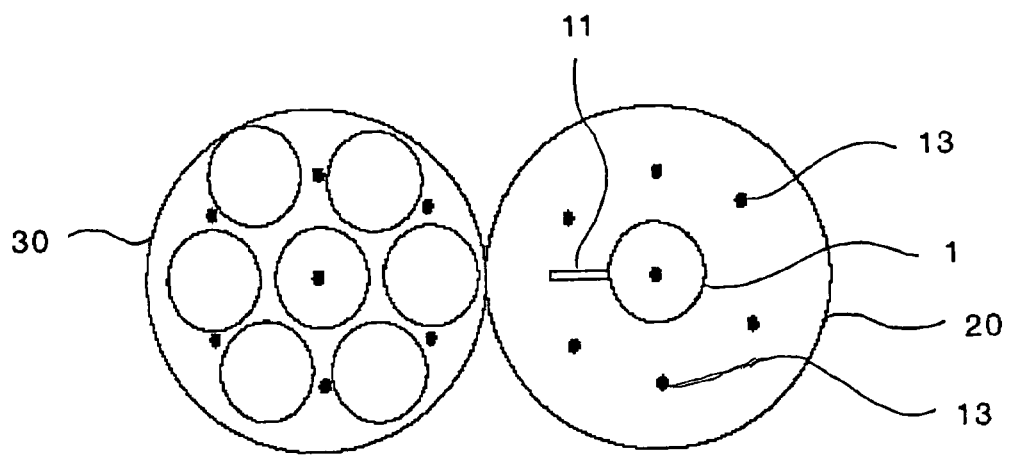
FIGS. 5 and 6 are top views showing successive stages of the transfer of a tank between adjacent platforms.
Figure 6:
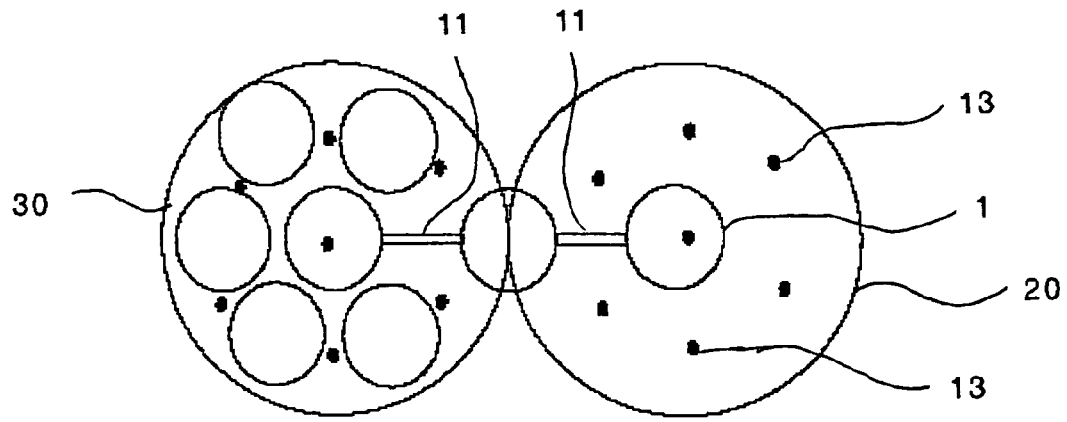
Figure 7:
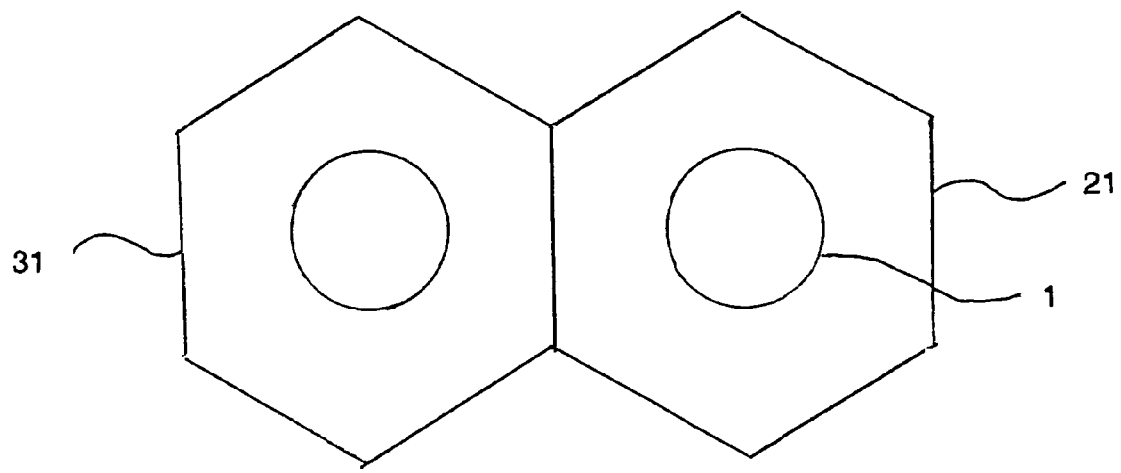
FIG. 7 is a top view of another embodiment of the invention showing two adjacent platforms.

The transportation platform shown in FIG. 1 includes a central inner structure 1 which may have any suitable configuration, such as a cylindrical or tubular shape. A number of plates or frames are mounted to the central structure 1 for supporting propellant tanks. The plates or frames may have any suitable configuration, such as a circular or hexagonal shape, as shown in FIGS. 5–7.

Figure 2:
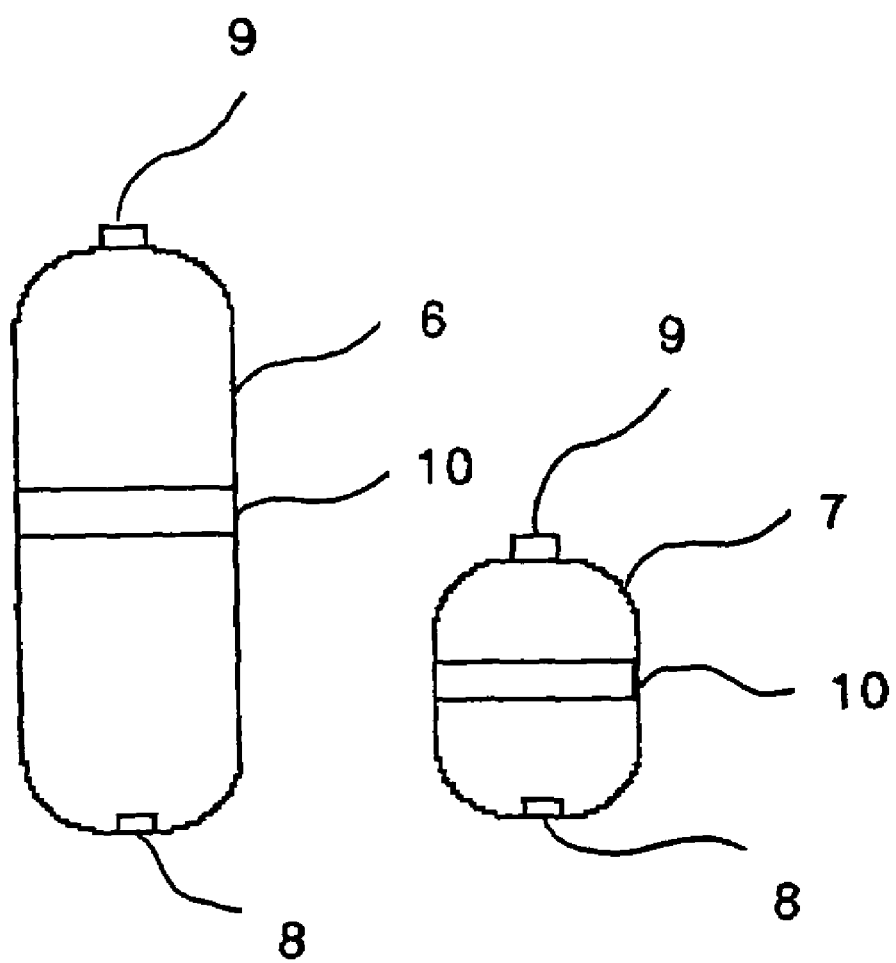
FIG. 2 is a side view of different size propellant tanks which can be stored and transferred by the present invention.

In the embodiment shown in FIG. 1, an upper plate 2, a middle plate 3 and a lower plate 4 are mounted at predetermined spaced intervals along the central structure 1 to support propellant tanks therebetween. The platform shown in FIG. 1 is configured to support an upper group of taller tanks 6 between the plates 2 and 3, and a lower group of shorter tanks 7 between the plates 3 and 4. The taller tanks 6 can contain any suitable propellant, such as hydrogen, and the shorter tanks 7 can contain any suitable propellant, such as oxygen. The tanks 6 and 7 can be of substantially similar diameters but different lengths, so that a set of tanks 6 and 7 can supply the desired ratio of the two propellants. For example, a hydrogen tank 6 may be twice as long as an oxygen tank 7. Further, an oxygen tank 7 may be approximately eight times heavier than a hydrogen tank 6. As shown in FIG. 2, the tanks 6 and 7 include bands 10 around central portions thereof. Further, the tanks 6 and 7 can also include discharging nozzles or ports 8 on bottom portions thereof, and pressurizing nozzles or ports 9 on top portions thereof.

Although the embodiment shown in FIG. 1 is configured to support two layers of tanks, any suitable number of plates or frames may be provided in order to support any suitable number of layers. Further, the plates or frames may be spaced at any suitable intervals in order to support tanks of various sizes. Although a layer includes six tanks as shown in FIG. 5, any suitable number of tanks may be included in a layer. Further, each layer may contain the same number of tanks, in corresponding vertically aligned positions, so that a pair of aligned tanks 6 and 7 can be transferred to or from the platform.

The transportation platform includes a rocket engine or motor 5 to propel the platform through space as a transport vehicle. The platform also includes suitable positioning mechanisms, such as thrusters 14, for positioning and aligning the platform in space. Such motors 5 and thrusters 14, along with other operable mechanisms on the vehicle, may be controlled in any suitable manner, such as by remote control. The platform also includes holders 15 for connection of cargo or payloads to the platform.

As shown in FIGS. 5 and 6, spacers 13 are provided between tanks to define storage positions or berths on the platform. The spacers 13 may have any suitable configuration, such as in the form of vertically extending spacer bars. Each storage position includes a holder 17 and a propellant transfer interface 16. The holders 17 resiliently press down on a tank in the storage position to releasably hold the tank. The interfaces 16 are capable of transferring propellant from a tank in the storage position. The transferred propellant may be used to power the transportation platform, such as for powering the motor 5. The interface 16 includes a flexible pipe portion for connection with a discharging nozzle or port 8 of a tank. The interface 16 may further include a blade for puncturing a seal of a port 8.

Transfer mechanisms are provided on the platform for transferring tanks to and from the storage positions. An individual transfer mechanism may be provided for each of the separate storage positions. Each transfer mechanism includes an extendable arm 11 mounted to the central structure 1. The arms 11 are configured to extend radially from the central structure 1 at vertical mid-portions of the storage positions. The extendable arms 11 may be of any suitable configuration, such as in the form of telescoping arms. Further, each arm includes a gripper 12 at the free end thereof. The grippers 12 are configured to positively grip bands 10 provided on the tanks.

Figure 10:
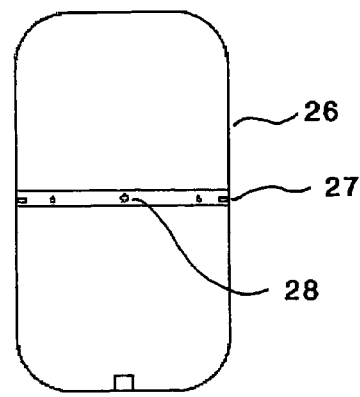
FIG. 10 is a side view of a propellant tank having holes for receiving insertion pins.
Figure 11:
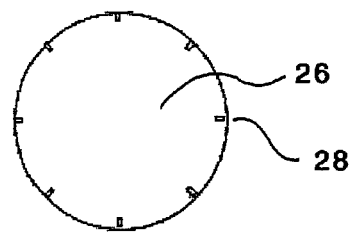
FIG. 11 is a top view of a propellant tank having holes for receiving insertion pins.

FIGS. 8–11 show another transfer mechanism which includes extendable arm 11 having an insertion pin 22 with an expandable tip portion. The tip portion of the insertion pin 22 is configured to be inserted into a hole 28 provided in the wall of a tank 26. The hole 28 can be formed in a built-up or reinforced wall portion 27 of the tank 26, with the interior of the hole 28 defined by inner wall portions 29. As shown in FIGS. 10 and 11, the reinforced wall portion 27 can extend around the perimeter of the tank 26, and a plurality of holes 28 can be provided therein.

Figure 8:
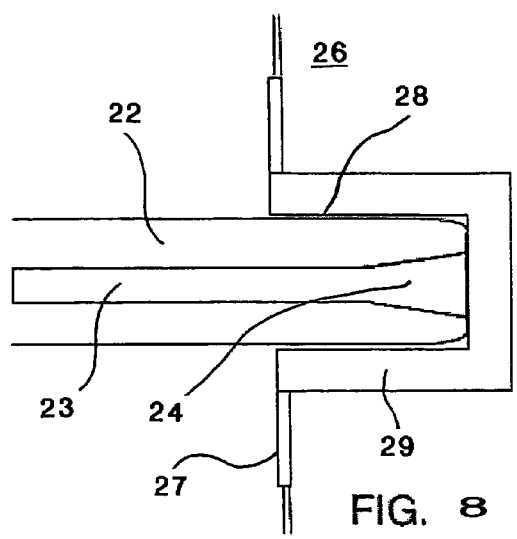
FIG. 8 is a partial view showing the tip of an insertion pin received in a hole of a tank.
Figure 9:
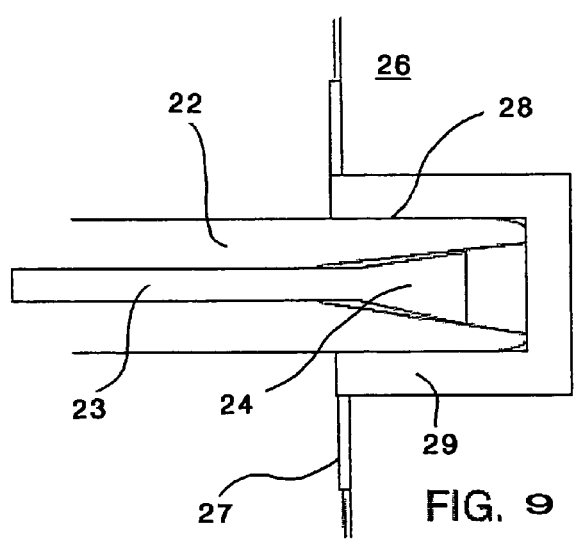
FIG. 9 is a partial view showing the tip of an insertion pin expanded in a hole of a tank.

As shown in FIG. 8, a tip portion of an insertion pin 22 can be received in a hole 28 in a nonexpanded condition. As shown in FIG. 9, the tip portion can be radially expanded in order to grippingly engage the inner wall of the hole 28. The tip portion of the insertion pin 22 can be radially expanded in any suitable manner, by any suitable mechanism. In the embodiment shown in FIGS. 8 and 9, a retractable rod 23 having a tapered end portion 24 is located in an axial through hole of the insertion pin 22. As shown in FIG. 9, when the rod 23 is retracted, the tapered end portion 24 engages a tapered portion of the through hole and presses it outwardly in order to expand the tip portion and grip the inner wall of a hole 28.

The present disclosure contemplates a system which includes a plurality of such transportation vehicles, and a process for transferring propellant tanks between such platforms.

FIGS. 3 through 6 show two platforms 20 and 30 which are positioned adjacent to each other for transfer of propellant tanks therebetween. Further, although FIGS. 5 and 6 depict platforms having circular frames, FIG. 7 shows two platforms 21 and 31 positioned adjacent to each other which include hexagonal frames. It is noted that the structure of these platforms is substantially the same as that described above with regard to FIG. 1. Accordingly, the explanation of such similar elements is not repeated here. Further, some structures have been omitted from the views depicted in FIGS. 3 through 7 in order to provide a clear and unencumbered depiction of the transfer process.

Figure 3:
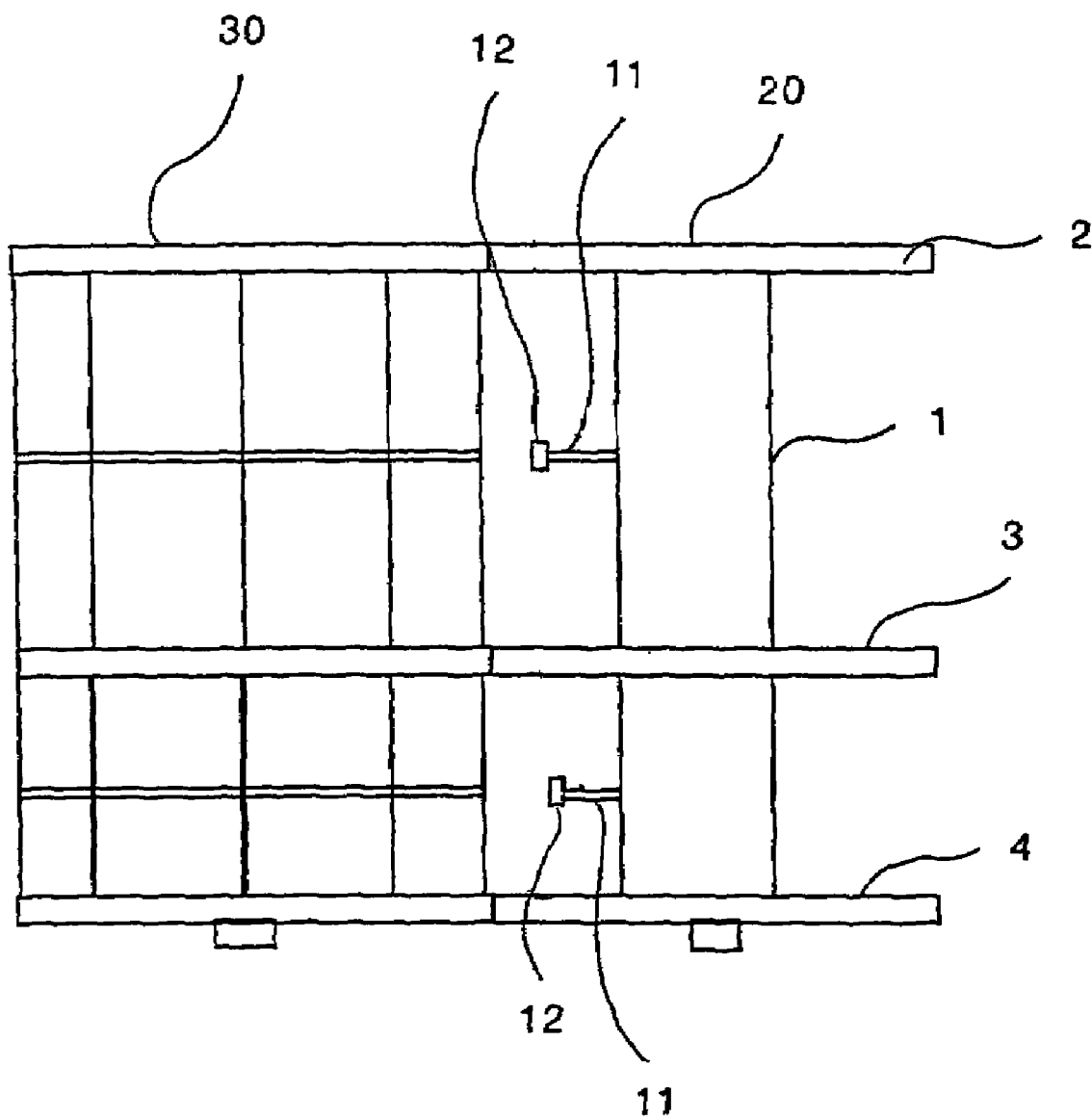
FIGS. 3 and 4 are side views showing successive stages of the transfer of a tank between adjacent platforms.

As shown in FIGS. 3 and 5, the two vehicles 20, 30 involved in the propellant transfer are docked in such a manner that a tank inside a berth of the delivering vehicle 30 faces an empty berth of the receiving vehicle 20. Tanks are held in place by the extendable arms 11 that are normally retracted inside the central structure 1. The grippers 12 hold the tanks firmly in position by their waistbands 10.

Figure 4:
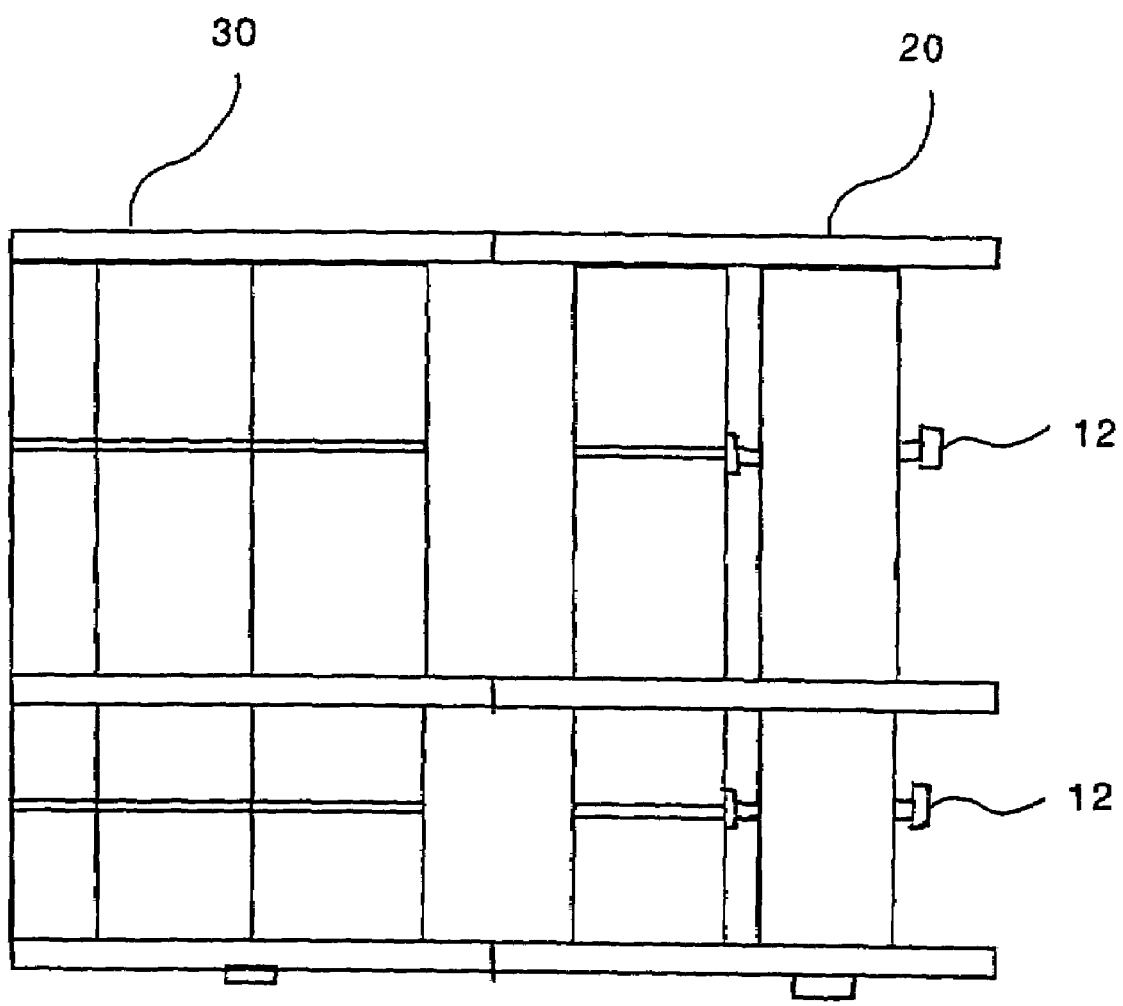

As shown in FIG. 6, the tank in a berth of the donor vehicle 30, which is aligned with an empty berth in the receiving vehicle 20, is pushed out by the extending arm 11 toward the empty berth in the vehicle 20. At the same time, the arm 11 in the empty berth is extended, its gripper 12 grips the tank's waistband 10 and pulls the tank into the empty berth and holds it there, as shown in FIG. 4. Since all this happens in weightless space the heavy tanks move easily and little force needs be expended by the arms 11 in order to move the propellant tanks. Further, instead of the arms 11 having grippers 12 for tanks with waistbands 10, the tanks can have holes 28, and be held and transferred by arms having insertion pins 22 with expandable tip portions.

After a tank has been exchanged, the platforms 20 and 30 can undock, recede from each other by a short distance, and perform a sixty degree rotation. The platforms can then dock again, with another tank containing berth of the donor vehicle 30 aligned with another empty berth of the receiving vehicle 20. The tank transfer procedure may be repeated until the receiving vehicle 20 has received an adequate number of tanks to be sufficiently fueled. The receiving vehicle 20 can then begin, or continue, its trip.

The receiving vehicle 20 may not require use of the propellant contained in the tanks which it has received, but will instead transport the received tanks to a different location for transfer to another vehicle, such as a lunar lander. Sometimes however, the receiving vehicle 20 will need the propellant from the received tanks for its own propulsion. In such circumstances, the discharge port 8 of a received tank will be opened and connected to the piping system that feeds the rocket engine 15. A nozzle at the end of the flexing pipe will be forced into the lower tank port 8 so as to create a seal, and a sharp blade will puncture a thin diaphragm that seals the port 8. The tank contents will then be used in total, since an open tank can no longer be transferred between platforms or vehicles.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed is:

1. A platform for storage and transfer of propellant tanks in space, comprising:
   a plurality of frames configured to releasably support plural propellant tanks in predetermined storage positions; and
   at least one transfer mechanism configured to transfer a propellant tank to and from at least one of the predetermined storage positions;
   wherein the predetermined storage positions are defined by spacer elements on said frames, said spacer elements being located between propellant tanks.

2. The platform according to claim 1, wherein the plural propellant tanks include fuel tanks and oxidizer tanks.

3. The platform according to claim 1, wherein the predetermined storage positions are located between respective ones of said frames.

4. The platform according to claim 1, wherein each of said frames is a substantially circular disk.

5. The platform according to claim 1, wherein each of said frames is a substantially hexagonal disk.

6. The platform according to claim 1, wherein said at least one transfer mechanism includes an extendable arm.

7. The platform according to claim 6, wherein said extendable arm is an axially extendable telescoping arm.

8. The platform according to claim 6, wherein said extendable arm includes an end effector configured to grip a band on a propellant tank during transfer to and from the at least one predetermined storage position.

9. The platform according to claim 6, wherein said extendable arm includes an insertion pin having a tip portion configured to be received in a hole in a propellant tank, the tip portion of the insertion pin being configured to expand within the hole in order to grip a propellant tank during transfer to and from the at least one predetermined storage position.

10. The platform according to claim 1, wherein said at least one transfer mechanism includes a plurality of said transfer mechanisms.

11. The platform according to claim 10, wherein said transfer mechanisms correspond to the predetermined storage positions, such that each of said transfer mechanisms is configured to transfer a propellant tank to and from a corresponding one of the predetermined storage positions.

12. The platform according to claim 10, wherein said transfer mechanisms include extendable arms.

13. The platform according to claim 12, wherein said extendable arms are axially extendable telescoping arms.

14. The platform according to claim 12, wherein said extendable arms include end effectors configured to grip a band on a propellant tank during transfer to and from the predetermined storage positions.

15. The platform according to claim 12, wherein said extendable arms include insertion pins having tip portions configured to be received in a hole in a propellant tank, the tip portions of the insertion pins being configured to expand within the hole in order to grip a propellant tank during transfer to and from the predetermined storage positions.

16. The platform according to claim 1, further comprising an attitude control system including thrusters for positioning the platform.

17. The platform according to claim 1, wherein the platform is configured to be positioned in orbit around a celestial body.

18. The platform according to claim 1, wherein the platform is a transportation platform for transportation and storage of cargo in space, the platform further comprising a motor for moving the platform through space.

19. The platform according to claim 18, further comprising a transfer interface through which propellant contained in a propellant tank releasably supported in one of the predetermined storage positions is transferred from the propellant tank for use in operating the motor.

20. The platform according to claim 18, wherein the platform is configured to transport cargo from an Earth orbit to lunar orbit.

21. A platform for storage and transfer of propellant tanks in space, comprising:
   a plurality of frames configured to releasably support plural propellant tanks in predetermined storage positions;
   at least one transfer mechanism configured to transfer a propellant tank to and from at least one of the predetermined storage positions; and
   a central structure,
   wherein said frames are connected to said central structure at predetermined spaced intervals.

22. The platform according to claim 21,
   wherein said at least one transfer mechanism includes a plurality of transfer mechanisms; and
   wherein said transfer mechanisms are mounted to said central structure.

23. A system for storage and transfer of propellant tanks in space, said system comprising:
   a plurality of platforms comprising at least one frame configured to releasably support propellant tanks in predetermined storage positions, and at least one transfer mechanism configured to transfer a propellant tank to and from at least one of the predetermined storage positions;

wherein a first of the platforms and a second of the platforms are configured to be positioned adjacent to each other in such a manner that one of the predetermined storage positions of the first platform is aligned with one of the predetermined storage positions of the second platform.

24. The system according to claim 23, wherein the transfer mechanism of the first platform transfers a propellant tank from the one predetermined storage position of the first platform toward the second platform, and the transfer mechanism of the second platform transfers the propellant tank received from the first platform to the one predetermined storage position of the second platform.

25. The system according to claim 23, wherein the first and second platforms are configured to be repositioned in such a manner that another of the predetermined storage positions of the first platform is aligned with another of the predetermined storage positions of the second platform.

26. The system according to claim 23, wherein the transfer mechanisms include extendable arms.

27. The system according to claim 26, wherein said extendable arms are axially extendable telescoping arms.

28. The system according to claim 26, wherein said extendable arms include end effectors configured to grip a band on a propellant tank during transfer to and from the predetermined storage positions.

29. The system according to claim 26, wherein said extendable arms include insertion pins having tip portions configured to be received in a hole in a propellant tank, the tip portions of the insertion pins being configured to expand within the hole in order to grip a propellant tank during transfer to and from the predetermined storage positions.

30. The system according to claim 23, wherein each of the platforms further comprises an attitude control system including thrusters for positioning the platform.

31. The system according to claim 23, wherein at least one of the platforms includes a motor for moving the platform through space.

* * * * *